United States Patent
Chcouri et al.

(10) Patent No.: US 11,704,116 B2
(45) Date of Patent: *Jul. 18, 2023

(54) SCRIPTING LANGUAGE COMPUTER PROGRAM MODIFICATION METHODOLOGY, SYSTEM AND SOFTWARE

(71) Applicant: JUSTDO, INC., San Francisco, CA (US)

(72) Inventors: Daniel Chcouri, Lantau (HK); Joshua Ohlman, Delton, MI (US)

(73) Assignee: JUSTDO, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/957,806

(22) Filed: Sep. 30, 2022

(65) Prior Publication Data
US 2023/0045641 A1     Feb. 9, 2023

Related U.S. Application Data

(63) Continuation of application No. 17/314,500, filed on May 7, 2021, now Pat. No. 11,461,092, which is a continuation of application No. 16/957,299, filed as application No. PCT/US2019/012736 on Jan. 8, 2019, now Pat. No. 11,003,441.

(60) Provisional application No. 62/615,215, filed on Jan. 9, 2018.

(51) Int. Cl.
| | |
|---|---|
| G06F 8/71 | (2018.01) |
| G06F 8/36 | (2018.01) |
| G06F 9/445 | (2018.01) |
| G06F 8/40 | (2018.01) |

(52) U.S. Cl.
CPC ............ *G06F 8/71* (2013.01); *G06F 8/36* (2013.01); *G06F 9/44526* (2013.01); *G06F 8/40* (2013.01)

(58) Field of Classification Search
None
See application file for complete search history.

(56) References Cited

U.S. PATENT DOCUMENTS

| | | | | |
|---|---|---|---|---|
| 5,495,567 | A * | 2/1996 | Iizawa | G06F 16/289 707/999.102 |
| 7,150,003 | B2 * | 12/2006 | Naumovich | G06F 9/4492 713/176 |
| 9,715,378 | B2 | 7/2017 | Dickerson | |

(Continued)

FOREIGN PATENT DOCUMENTS

WO     2015/092519 A1     6/2015

OTHER PUBLICATIONS

Schulte, "Repairing COTS Router Firmware without Access to Source Code or Test Suites: A Case Study in Evolutionary Software Repair", 2015, ACM (Year: 2015).*

(Continued)

*Primary Examiner* — Hossain M Morshed
(74) *Attorney, Agent, or Firm* — The Dobrusin Law Firm, P.C.; Daniela M. Thompson-Walters

(57) ABSTRACT

A method, system, and software for adding to, extending or otherwise modifying a pre-existing computer program, written in a scripting language, with a new source code, written in a scripting language, without the need to sham underlying source code of the pre-existing computer program or the newly modified source code.

18 Claims, 9 Drawing Sheets

(56) References Cited

U.S. PATENT DOCUMENTS

| | | | |
|---|---|---|---|
| 10,447,483 B1 | 10/2019 | Su | |
| 10,761,839 B1* | 9/2020 | Migoya | G06F 8/427 |
| 2008/0109785 A1* | 5/2008 | Bailey | G06F 8/34 |
| | | | 717/109 |
| 2008/0244509 A1* | 10/2008 | Buchs | G06F 16/958 |
| | | | 717/110 |
| 2009/0055757 A1* | 2/2009 | Chaney | G06F 9/451 |
| | | | 715/762 |
| 2009/0100128 A1 | 4/2009 | Czechowski, III | |
| 2010/0058338 A1* | 3/2010 | Schneider | G06F 9/4486 |
| | | | 718/1 |
| 2010/0175057 A1* | 7/2010 | Simons | A63F 13/63 |
| | | | 717/110 |
| 2011/0055805 A1* | 3/2011 | Herdeg | G06F 9/45525 |
| | | | 717/106 |
| 2011/0088011 A1* | 4/2011 | Ouali | G06F 11/36 |
| | | | 717/105 |
| 2012/0317564 A1* | 12/2012 | Lee | G06F 8/61 |
| | | | 717/175 |
| 2013/0139140 A1 | 5/2013 | Rao | |
| 2014/0007048 A1* | 1/2014 | Qureshi | H04L 9/0891 |
| | | | 717/110 |
| 2014/0007222 A1* | 1/2014 | Qureshi | H04L 67/10 |
| | | | 726/16 |
| 2014/0201709 A1* | 7/2014 | Euerle | G06F 9/45529 |
| | | | 717/106 |
| 2016/0013934 A1 | 1/2016 | Smereka | |
| 2016/0294614 A1 | 10/2016 | Searle | |
| 2017/0060559 A1 | 3/2017 | Ye | |
| 2017/0157512 A1* | 6/2017 | Long | A63F 13/497 |
| 2018/0052681 A1 | 2/2018 | Pereira Cabral et al. | |
| 2018/0314622 A1* | 11/2018 | Lowe | G06F 11/3616 |
| 2018/0341571 A1 | 11/2018 | Kislovskiy | |
| 2018/0357079 A1* | 12/2018 | Demulder | G06F 11/3089 |
| 2019/0265965 A1 | 8/2019 | Acharya | |
| 2020/0068365 A1 | 2/2020 | Esselink | |

OTHER PUBLICATIONS

International Search Report for International Application PCT/US19/012736, dated Mar. 28, 2019.

International Preliminary Report on Patentability, Application No. PCT/US19/012736 dated Apr. 27, 2020.

Apple, "Plug-in Architectures", Apple, 2013 at https://developer.apple.com/library/archive/documentation/Cocoa/Conceptual/Loading_Code/Concepts/Plug (Year: 2013).

Anonymous: "ProGuard Manual | Introduction | GuardSquare", Dec. 31, 2017, XP055835636, Retrieved from the Internet at: https://web.archive.org/web/20171231051811/http://www.guardsquare.com/en/proguard/manual/introduction#mainmenu, Accessed on Aug. 27, 2021.

Anonymous: "Use Browserify and Minifyify to Combine, Minify and Obfuscate Multiple JavaScript Files", Apr. 3, 2017, XP055835638, Retrieved from the Internet at: https://web.archive.org/web/20170403064809/https://sethlakowske.com/articles/use-browserify-and-minifyify-to-combine-minify-and-obfuscate-multiple-javascript-files/, Accessed on Aug. 27, 2021.

Supplementary European Search Report dated Aug. 30, 2021, Application No. EP19738443.

Hardesty, "Automatic Bug Repair", 2015, MIT News Office (Year: 2015).

* cited by examiner

Package A:

```
// This function will accept first name and last name,
// and will return the full name:

function full_name (first_name, last_name) {
     var full_name = first_name + ' ' + last_name;
     return full_name;
}
```

Package B:

```
// This function receives two parameters, and
// returns the sum of both function add_2_numbers  (number1, number2) {
     return number1 + number2;
}
```

Package C (depends on Package B) :

```
// This function receives 4 parameters and returns the sum of all function add_4_numbers  (first_number, second_number,
                        third_number, fourth_number) {
     var first_two = add_2_numbers (first_number,second_number);
     var other_two = add_2_numbers (third_number,fourth_number);
     var result = add_2_numbers (first_two, other_two);
     return result;
}
```

*Fig. 3a*

After uglification, the package will turn into:

Package A:
```
function full_name(n,o){var l=n+" "+o;return l}
```

Package B:
```
function add_2_numbers(n,o){return n+o}
```

Package C (depends on Package B):
```
function add_4_numbers(n,o,l,e){var m = add_2_numbers (n,o),
c=add_2_numbers(l,e),u=add_2_numbers(m,c);return u}
```

*Fig. 3b*

**And after unification, we will get the *original bundle*:**

```
function full_name(n,o){var l=n+" "+o;return l};function
add_2_numbers(n,o){return n+o}function add_4_numbers(n,o,l,e){var
m=add_2_numbers(n,o),c=add_2_numbers(l,e),u=add_2_numbers(m,c);return u}
```

*Fig. 3c*

The 3rd party developer will receive:

1. The *original uglified bundle:*

```
function full_name(n,o){var l=n+" "+o;return l};function
add_2_numbers(n,o){return n+o}function add_4_numbers(n,o,l,e){var
m=add_2_numbers(n,o),c=add_2_numbers(l,e),u=add_2_numbers(m,c);return u}
```

2. A list of empty packages with their dependencies:

Package A:

Package B:

Package C (depends on Package B) :

3. The documentation of available features/functions.

*Fig. 3d*

The 3rd party developer will receive:

Package A:

Package B:

Package C (depends on Package B):

Package D (depends on Package A and Package C):
```
function report_total_milage(user, trips) {
    print(full_name(user.first_name, user.last_name) +
        ": " +
        add_4_numbers(trips[1].milage,
                      trips[2].milage,
                      trips[3].milage,
                      trips[4].milage )
    )
}
```

*Fig. 3e*

And using the uglifier will get the *new uglified bundle:*

```
function report_total_milage(n,l){print(full_name(n.first_name,n.last_name)+": " +
add_4_numbers(l[1].milage,l[2].milage,l[3].milage,l[4].milage))}
```

*Fig. 3f*

The *Merge Tool* will receive the *original uglified bundle*, the *new uglified bundle*, and will merge them to the *final uglified bundle* that will represent the entire extended project while protecting the intellectual property of all the parties:

```
function full_name(n,o){var l=n+" "+o;return l};function
add_2_numbers(n,o){return n+o}function add_4_numbers(n,o,1,e){var
m=add_2_numbers(n,o),c=add_2_numbers(1,e),u=add_2_numbers(m,c);return
u}function report_total_milage (n,l) { print( full_name( n.first_name , n.last_name)+" " +
add_4_numbers ( l[1].milage, l[2].milage, l[3].milage, l[4].milage)}}
```

*Fig. 3g*

1. Inputs The algorithm takes a set of inputs:

- List of Plugin Package Names: A list of package names

- Name & Index of Package from Plugin Bundle

- List of Packages in the Output Program

- Last insertion index (since this is the first package added we use the initial value of -1)

*Fig. 4a*

1. Inputs The algorithm takes a set of inputs:

- List of Plugin Package Names: A list of package names

- Name & Index of Package from Plugin Bundle

- List of Packages in the Output Program

- Last insertion index

*Fig. 4b*

1. Inputs The algorithm takes a set of inputs:

- List of Plugin Package Names: A list of package names

- Name & Index of Package from Plugin Bundle

- List of Packages in the Output Program

- Last insertion index

*Fig. 4c*

List of Packages in the Output Program
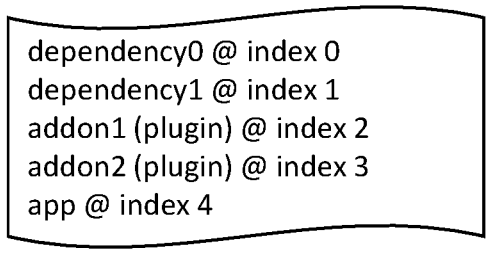
dependency0 @ index 0
dependency1 @ index 1
addon1 (plugin) @ index 2
addon2 (plugin) @ index 3
app @ index 4
Last Insertion Index
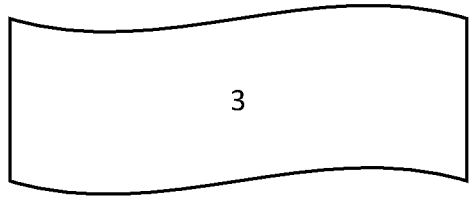
3
*Fig. 4d*

SCRIPTING LANGUAGE COMPUTER PROGRAM MODIFICATION METHODOLOGY, SYSTEM AND SOFTWARE

CLAIM OF BENEFIT OF FILING DATE

The present application claims the benefit of the filing date of U.S. Application Ser. No. 62/615,215 (filed Jan. 9, 2018), the contents of which are hereby expressly incorporated by reference for all purposes.

FIELD

The present teachings relate generally to computer software development, and more particularly to a method, system, and software for improving computer software development collaboration technologies and methodologies for modifying a pre-existing computer program, specifically one written in a scripting language, without the need to reveal source code of the pre-existing computer program and without the need to reveal source code of the modification.

BACKGROUND

It is often the case with computer software development that, over time, multiple persons contribute to a development. For example, it is common for some software developers to outsource some of the development to third parties such as freelancers, outside studios, consultancies, or otherwise.

For a typical computer programmer to modify a pre-existing computer program that was not written in one of the traditional compiled languages (e.g., C or C++), it has been necessary for an author of the modification (which may include a new feature, a bug fix, or otherwise) to access the underlying source code of the pre-existing computer program. This has especially been the case for computer programs written in a scripting language, such as JavaScript. However, the author or owner of the pre-existing computer program often has regarded the underlying source code as embodying valuable confidential information, even including trade secrets or other intellectual property rights. The author or owner thus has been reluctant to share his underlying source code of the pre-existing program. Likewise, the author or owner of a modification of the pre-existing computer program has been reluctant to share the underlying source code of the modification.

The need to access the underlying source code has tended to impede progress, because the author of the pre-existing computer program and the person desiring to author, or who has authored, the modification have been different. Thus, they may owe no implied obligation of confidentiality to each other. As a result, nondisclosure agreements have been necessary, as well as other security precautions that add steps to an overall transaction. The enforcement of such nondisclosure agreements (NDAs), when in place, is a slow and expensive process, with uncertain prospects for success. In addition, the process is not easy to scale. Trust has to be developed with each new potential cooperation. Unfortunately, to-date, the only alternative to the cumbersome NDAs process is to make the software 'open-source' (i.e. everyone can see the source code), at the expense of giving up on all trade-secrets and other potential commercial benefits.

There is a need to improve the ability (while using computers) of software developers to access and modify pre-existing computer programs, especially those written in a scripting language, while still safeguarding the confidentiality of the underlying source code. In a similar way, there is a need to improve the ability to access modifications to pre-existing computer programs, especially those written in a scripting language, while still safeguarding the confidentiality of the underlying source code of the modifications.

The present teachings have, as among their objectives, the ability to facilitate software development collaboration. For example, the present teachings have among their objectives, to enable third parties to modify computer programs written in a scripting language, while protecting the intellectual property represented by the original source code and the resulting modified source code.

SUMMARY

The present teachings meet one or more of the above needs and objectives by providing a method (and associated system and software) for modifying a pre-existing computer program written in a scripting language, without the need to access underlying source code of the original program or any of its modifications.

Among the various aspects of the present teachings there is contemplated a method that includes the steps of accessing a pre-existing computer program (e.g., one that is written in a scripting language) that includes at least one first package of source code and introducing to the computer program at least one second package of source code, also written in the scripting language, without revealing to an actor any underlying source code of the first package, and without revealing to any subsequent author any underlying source code of the second package.

As will be seen, the teachings illustrate a discrete, unique and unconventional approach to scripting language computer programming (e.g., by way of a collaboration, in which collaborators may be anonymous to each other and/or lack contractual privity with each other), and which can occur without the conventional exchange of underlying source code. The teachings are able to harness one or more technical features unique to scripting language and use it in an unconventional manner to afford software modification in a manner that preserves confidentiality in underlying source code.

DESCRIPTION OF THE DRAWINGS

FIGS. 3a-3g illustrate an example of how a pre-existing computer program may be modified consistent with the present teachings.

FIGS. 4a-4d illustrate an example of how an output program may be prepared consistent with the present teachings.

DETAILED DESCRIPTION

Figure 1:
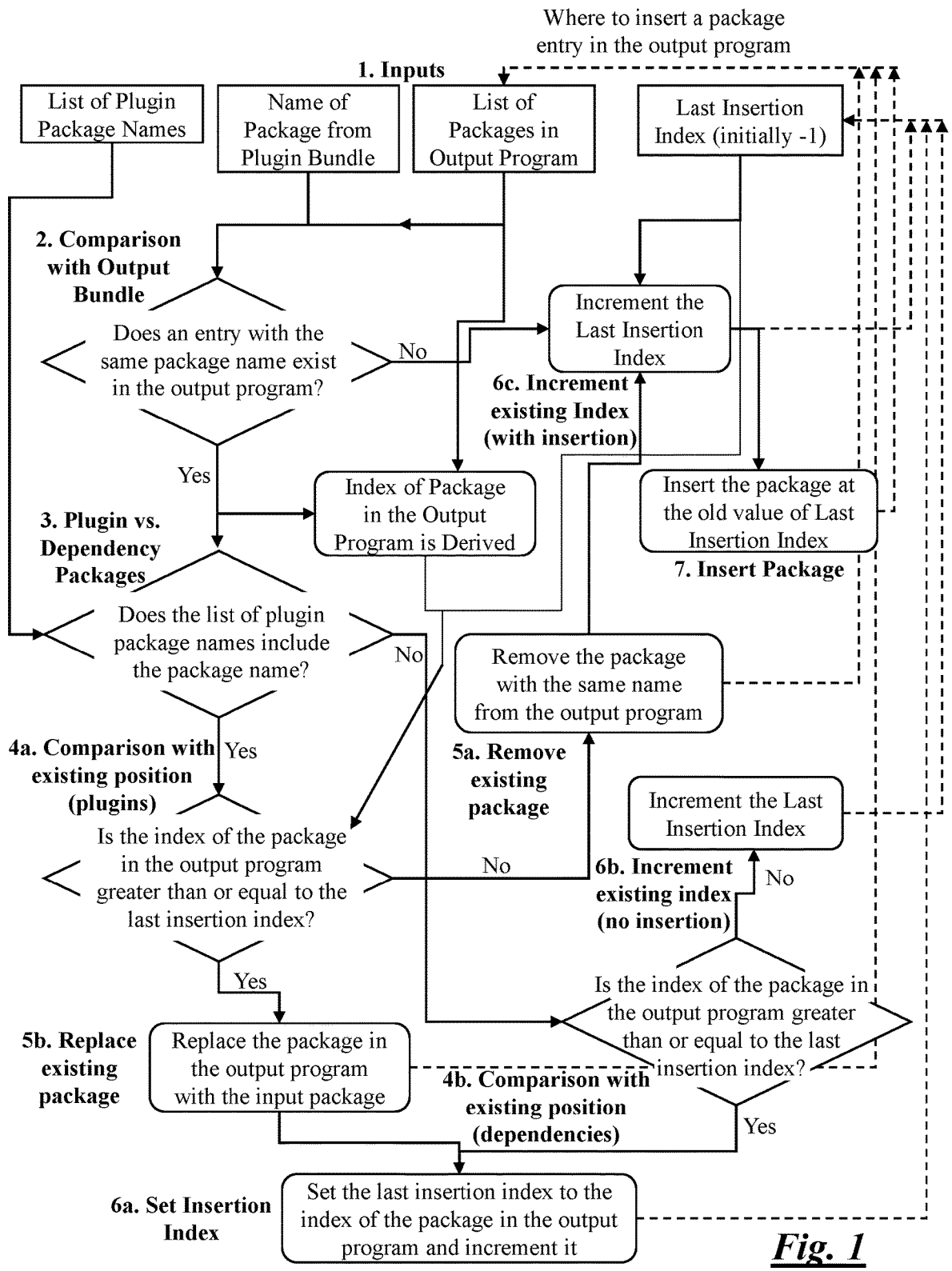
FIG. 1 is a flow diagram to illustrate how a package may be located within an output program.

The explanations and illustrations presented herein are intended to acquaint others skilled in the art with the teachings, its principles, and its practical application. Those skilled in the art ma adapt and apply the teachings in its numerous forms, as may be best suited to the requirements of a particular use. Accordingly, the specific embodiments of the present disclosure as set forth are not intended, as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the claims, which are also hereby incorporated by reference into this, written description.

I. Introduction

The teachings illustrate a discrete, unique, and unconventional approach to scripted language computer programming. It may be applicable to a collaboration, in which collaborators may be anonymous to each other and/or lack contractual privity with each other. The teachings allow modification to a pre-existing computer program without the conventional exchange of underlying source code. The teachings are able to harness one or more technical features unique to scripting language and use it in an unconventional manner to afford software modification in a manner that preserves confidentiality in underlying source code.

The term "collection of code" includes within its scope a body of source code, which may include one or more lines, functions, files, or other assembly of information that forms at least a part of a computer program. The term "package" includes within its scope one or more collections of code (e.g., it may include one or more software files, including identifiers and/or other information (e.g., documentation) about the files), each having a defined boundary (e.g., having start and end locations indicated) and being authored to achieve a particular functionality when employed alone or in combination with one or more other packages as part of an overall computer program. A package may be dependent on one or more other packages in order to function as intended. The term "bundle" includes within its scope a collection of one or a plurality of packages assembled together in a certain, order for achieving the intended functionality of at least a portion of a computer program. The term "plug-in" includes within its scope an enhancement, an extension, and addition or other modification to the functionality of a computer program; such enhancement or extension may be in the form of a performance characteristic, a change to a user interface, addition of functions, removal of functions, addition of features and any combination thereof or the like. The term "plug-in package" includes a package that includes at least one plug-in. A "plug-in package" may depend upon other packages of a "plug-in bundle" that facilitate the plug-in implementation; these latter packages, if they do not exist in the original pre-existing computer program, are not necessarily automatically to be regarded per se as a "plug-in" in the present context merely because they are part of a plug-in bundle.

A "modification" is a change to a pre-existing item. In the context of the present teachings, the term "modification" includes within its scope one or a plurality of "plug-ins" or "plug-in packages". The phrase "pre-existing computer program" includes a program in its originally authored state, as well as a program that previously has been modified; for example, a pre-existing program may be free of any plug-ins, or it may include one or more plug-ins (and such plug-ins need not have been authored contemporaneously with program in its originally authored state or by the same author). The term "minification" (and its variations) refers to a process (e.g., using software tools such as UglifyJS or Google Closure Compiler) that includes removing unnecessary characters from source code (e.g., software code) while still preserving the source code functionality and sufficiently obfuscating the source code to render reverse engineering and human readability of the source code difficult in the absence of significant labor burden, expense and/or specialized tools. The term "uglification" is a form of minification, which may employ specialized software; for instance, UglifyJS is regarded as a JavaScript optimizer that can minify and generate source maps in a manner that renders reverse engineering of minified code very difficult. The term "assets" includes electronically stored information that may comprise some or all of a package; it may include one or more files, tables, code, or otherwise.

The present teachings involve introducing one or more modifications to a pre-existing computer program (e.g., a computer program, written in a script language), without requiring revelation of the code of the pre-existing computer program to one or more authors of the one or more modifications. To this end, the teachings contemplate and make possible methods of collaborating on software development projects and/or modifying a pre-existing computer program (e.g., a computer program written in a script language) without requiring traditional measures by the owner of the pre-existing computer program to safeguard secrecy of the underlying code in the pre-existing computer program.

It should be appreciated that the teachings herein are mainly directed toward development of modified computer programs that have been authored in a scripting language (e.g., JavaScript). However, the teachings are not limited only to such applications. The teachings may have application and may be employed in connection with other computer programs. Thus, even if not explicitly stated, references to any pre-existing computer program covers programs written in a scripting language.

In general, the teachings envision enabling developers writing modifications to a pre-existing computer program without providing access to the source code of the pre-existing computer program. However, in accordance with an aspect of the teachings, any such step of accessing the pre-existing computer program may be performed without exposing the underlying code of the pre-existing computer program to the developer accessing the pre-existing computer program. Rather, the teachings envision a step of minifying the pre-existing computer program so that the underlying source code is obfuscated.

With reference to one particular aspect of the teachings, there is contemplated a method for modifying a pre-existing computer program (e.g., one written in a scripting language) by adding to the pre-existing computer program at least one plug-in bundle (e.g., code that includes at least one plug-in package) of source code written in a scripting language without the need to access underlying source code of the pre-existing program.

The teachings herein make use of a unique, and unconventional method by which the addition of at least one plug-in of code employs steps of identifying one or more packages from within an input bundle representative of the pre-existing computer program after such program has been minified (e.g., uglified). Identified packages are compared with one or more packages of the plug-in bundle and are merged into an output bundle based upon the results of the comparison. The merging operation may involve applying a series of comparisons and ordering of packages according to pre-defined rules. For instance, the merging operation may involve applying a series of comparisons and ordering of packages according to a set of pre-defined rules of selection and/or ordering rules. These pre-defined rules may be part of an algorithm that is included in the software of the present teachings for performing the merging operation. It should be recognized that the above described comparison and/or ordering approach (other similar descriptions herein) is described by reference to discrete identifiable "packages". The comparing and ordering approach may be employed with reference to some other component of the computer program. For example, it may be performed with reference to one or more discrete and identifiable collections of code (e.g., files), or by some arbitrarily selected boundary. Accordingly, the teachings are not limited only to comparison and ordering of packages.

As part of the merging operation, at least two sub-operations may be occurring. In one sub-operation, the above-noted comparison takes place and packages are selected for inclusion in an output program based upon the presence or absence of packages having the same identifier as between a modification and a pre-existing computer program. In one sub-operation, the above-noted comparison may take place in order to establish the sequence of packages, according to the ordering rules. As this takes place, an indexing may also occur by which packages are incrementally assigned an order location so that execution (including any dependency requirements) of packages in the resulting modified computer program (i.e., the computer program resulting in the output bundle) is performed in the proper order.

As seen, the method of the present teachings thus may include a step of accessing (which may occur by use of a computer and software of the present teachings) a pre-existing computer program that is written in a scripting language and includes at least one pre-existing first package of source code that is written in a scripting language and has a first identifier. The method may also include a step of introducing into the pre-existing computer program at least one second package of source code, also written in the scripting language and having a second identifier, without revealing to an author any underlying source code of the first package, and without revealing to any subsequent author, or the first author, any underlying source code of the second package (e.g., as a result of a step of minifying the underlying source code). The method may perform the introducing step using a merging operation (which may be performed automatically by a computer) that employs a pre-defined set of rules, such as the selection and/or ordering rules taught herein. A step of indexing may also be employed for incrementally assigning an order in order to comply with any necessary dependencies for subsequent execution of the resulting modified computer program.

The teachings contemplate not only the methodology as described herein, but also software for executing the methodology. The software may include one or more algorithms (e.g., for performing one or more of the comparing, ordering (by use of the selecting and/or ordering rules), and/or indexing steps).

The teachings also contemplate a system for performing the methodology of the present teachings. The system may employ at least one computer processor capable of executing the software of the present teachings upon a pre-existing computer program to which a plug-in bundle is desired to be introduced. The system may include one or more memory units in signaling communication with the computer processor that store the software of the present teachings, the pre-existing computer program, and/or the plug-in bundle.

The system may be part of a distributed computing network of plural remotely distributed computer processors and/or memory units.

The present teachings also contemplate a system for performing the methodology.

II. Method

Turning now in more detail to the methodology of the present teachings, it is described in the context of a pre-existing computer program that has been written in a scripted language (e.g., JavaScript). In an early step of the methodology a pre-existing computer program may be minified (e.g., uglified). In this manner, the source code of the pre-existing computer program is obfuscated to be generally undecipherable to a subsequent author without undue burden and expense. The minification may be performed by the system and/or software of the present teachings. It may be performed independently of the system and/or software of the present teachings (e.g., it may be performed by an available development platform, such as one that includes a build process with source files, e.g., that which is available at www.meteor.com).

Before, during or following minification, the pre-existing computer program may be divided into a plurality of discrete packages, if not already so divided. For example, before minification, a developer may divide a bundle that is representative of a pre-existing computer program into multiple discrete packages. The division into packages may be according to some predetermined criteria, e.g., logic, features-set, functionality of the package, or any combination thereof. The division of packages may be made by a developer according to some arbitrary criteria. Individual packages may be assigned an identifier (i.e., named) by a developer. The name or other identifier may be selected in accordance with conventions for the language of the plug-in (or component thereof), such as a convention for a name or other identifier for the scripting language employed.

An input bundle may be created that includes the minified pre-existing computer program. The input bundle may include the above-noted packages. The input bundle may be copied to a different location. For instance, the different location may be a location in a storage medium of the system of the present teachings where packages from the pre-existing computer program and any modification or plug-in bundle are to be built (e.g., sorted, added, omitted and/or ordered). It is possible, for example, that a pre-existing source code of a computer program may reside on a storage medium accessible only to an owner or original author of the program, but the input bundle is stored on a storage medium that is part of the system of the present teachings (e.g., a storage medium under the control of a website operator, who operates a website through which the methodology of the present teachings is executed).

One approach may be to copy the input bundle (e.g., minified pre-existing computer program) to a storage medium associated with an output bundle, thereby creating an "output program file", upon which method steps are performed for merging and ordering packages for achieving the resulting modified computer program (also referred to as an "output program"). The names or other identifiers of the packages within the input bundle may also be copied into the storage medium associated with the output bundle. It will be appreciated that in many collaborations the names or other identifiers of packages in an input bundle are known by the owner or author of the pre-existing computer program, and will be freely shared with the collaborator (e.g., an author of a plug-in bundle), possibly along with a description of a package functionality, and/or any location indicator as to a start and an end of each package. Such sharing, however, will be performed in a manner without revealing the underlying source code in a readily understandable way. For example, the source code may be provided in a minified form (e.g., a form not readily capable of being reverse engineered), while any or all identifiers (and possibly any descriptions of functionality and/or package start and end locators) may be shared without measures to safeguard confidentiality.

A plug-in bundle likewise is minified and packages are named. A plug-in bundle may employ the same name or other identifier as in the pre-existing computer program for any packages for which the plug-in is intended as a substitute.

In order to facilitate the build process, of the input bundle and/or the plugin bundle, one or more optional build control features (e.g., in the form of one or more build packages, that is, packages that only affect the build process and are not part of the input bundle and/or the plugin bundle) may be employed as needed in order to cooperate with any build software, to disable or modify, one or more build functions associated with any package of the input bundle and/or plug-in bundle. Also, it is possible that in the course of building (or an earlier step of minifying), a build package may be employed for splitting a body of source code in the pre-existing computer program into one or more packages. For example, some kinds of source code may not be split into packages by default. So, it may be necessary for a build package to split the code into packages during the build process. In addition, it is possible to introduce pseudo-packages which are referred to as "control packages" to help facilitate our processes to the bundles themselves. Prior to any merging of a plug-in bundle with an input bundle, any remaining control packages that would inhibit execution of the output bundle may be removed. Alternatively, or in addition, one or more control packages may be skipped during a build, in accordance with a functionality of the build software for recognizing a control package and causing the control package to be omitted from the build.

The plug-in bundle may be introduced into the same or a different storage medium as that containing the input bundle. Thus, it is possible that it is uploaded to a storage medium of the system of the present teachings, as was the minified input bundle of the pre-existing computer program.

Once both the plug-in bundle and the input bundle of the pre-existing computer program are stored, a build operation may be performed. Desirably, the build operation may also include a step of merging the plug-in bundle and the input bundle. A result of the merging step may be the creation of an output bundle.

For instance, in connection with a merging operation, there may be a step of copying (with or without overwriting) all assets from the input bundle into at least one output program file. After the input bundle is copied over to the at least one output program file, an output bundle may be generated. The output bundle may be generated by employing one or more merging operations. Specifically, the teachings herein may employ one or more merging operations by which rules (as described herein as selection and ordering rules) may be applied for determining any portions of the output program file(s) that will be overwritten or otherwise replaced by at least a portion of the plug-in bundle, as well as ordering (specifically, establishing the sequence location in the resulting program) of the packages that become assembled together. For instance, according to one such rule, plug-ins may overwrite any packages having the same identifier, so their assets also need to overwrite assets of the same identifier. It will be appreciated by the present teachings that the rules discussed herein encourage the use of common identifiers as between a pre-existing program and any modification. For example, the following rule necessitates the use of a common identifier if it is intended that a plug-in package be included in the output program: a plug-in package may be included in the output program if a package by the same identifier was in the pre-existing computer program. As noted, the teachings herein envision sharing of identifiers among developers or other authors, even though underlying code will be obfuscated as a result of minifying.

Merging of collections of code may then take place. Each bundle may contain a program file which describes the packages within that bundle and specifies the order in which those packages should be included as part of the program. In connection with building a resulting output program, the method of the present teachings includes one or more steps that assign one or more priority rules when building an output bundle with the desired modified computer program from an input bundle and a plug-in bundle. In general, it will be seen that source packages (i.e., packages from a pre-existing computer program) take precedence by default; this may ensure that versions are generally compatible with the original application. Plug-in packages generally will override source packages. The order of packages in a plug-in bundle generally will take precedence over the order of packages in the input bundle. More specifically, each package from any modification or "plug-in bundle" may be evaluated according to the selection and/or ordering rules described.

As will be understood from the following, one aspect of the teachings contemplates a method of modifying a preexisting computer program without access to its source code. The method involves making at least one comparison between a pre-existing program and a proposed modification. The comparison may be made by comparing identifiers of the pre-existing program with the identifiers of the modification. As a result of the comparison, the method will apply a selection step and an ordering step. With the selection step, the method will determine whether or not to include a modification. With the ordering step, if the method determines to include a modification via the selection step, the method will determine the appropriate location for inclusion of the modification within the pre-existing program. As a result, the method will locate the modification at its appropriate location within the pre-existing program. Though the selection step is illustrated as preceding the ordering step, it is not intended to foreclose other sequences. Accordingly, it is possible that an ordering step may be performed and then a selection step performed as to a modification. Further, comparing, selection and ordering steps may be repeated a number of times, for instance, to address selecting and ordering of each individual package of the modification relative to the pre-existing program.

The ordering step and/or the selection step may be performed in accordance with specific rules as described herein. For instance, the ordering step may be performed in accordance with a plurality of ordering rules. Such ordering rules may be employed for assuring proper dependency of packages. The selection step may be performed in accordance with a plurality of selection rules.

The following are rules that may be employed to govern whether a collection of code from a pre-existing computer program or each package from a modification (e.g., a plug-in bundle) is to be included (e.g., in an output bundle) for providing an output program. Any of a variety of selection rules may be employed. In the application of the selection rules, it is contemplated that a step of comparing identifiers as between a pre-existing computer program and the proposed plug-in package will be performed to determine whether or not the proposed package was in the pre-existing computer program.

Selection Rule 1: a plug-in package may be included in the output program if a package by the same identifier was in the pre-existing computer program. In such instance then the package from the pre-existing computer program is omitted from the output program. In other words, a package from the pre-existing computer program may be omitted from the output program if the package was in the pre-existing computer program and the package is the object of a plug-in package.

Selection Rule 2: a plug-in package may be included in the output program if a package with the same name was not in the pre-existing computer program.

Selection Rule 3: a package from a plug-in bundle that is not a plug-in package (for example, a package from a plug-in bundle that does not modify functionality of an underlying program but simply serves as a "placeholder" to facilitate a build and merge process) may be included in the output program (whether from the plug-in bundle or the pre-existing computer program) if a package having the same identifier was in both the pre-existing computer program and in the plug-in bundle.

Selection Rule 4: a package from a plug-in bundle that is not a plug-in package may be included in the output program if a package having the same identifier was not in the pre-existing computer program and is in the plug-in bundle.

Selection Rule 5: a package from a pre-existing computer program may be included in the output program if no package having the same identifier as a package in the pre-existing computer program is found in the plug-in bundle.

Any of a variety of ordering rules may be employed. Ordering rules may selected, for example, to guarantee that packages meet the dependency requirements within the output program. Any combination of the ordering rules may be employed by a merging program. Without intending to be limited thereto, the following are examples of rules that may govern the ordering of a file from a pre-existing computer program or a plug-in bundle as it is to be included in an output program. Of course, other ordering rules may be employed instead of, or in addition to the following examples.

Ordering Rule 1: a plug-in package having the same identifier as a package from the pre-existing computer program will take the location of the package with the similar identifier.

Ordering Rule 2: a plug-in package not having the same identifier as a package from the pre-existing computer program will take the location as arranged in the plug-in bundle, especially relative to any other plug-in packages in the plug-in bundle.

Ordering Rule 3: a package from a plug-in bundle not having the same identifier as a package from the pre-existing program will take the location as arranged in the plug-in bundle, especially relative to any other plug-in packages in the plug-in bundle.

Figure 2:
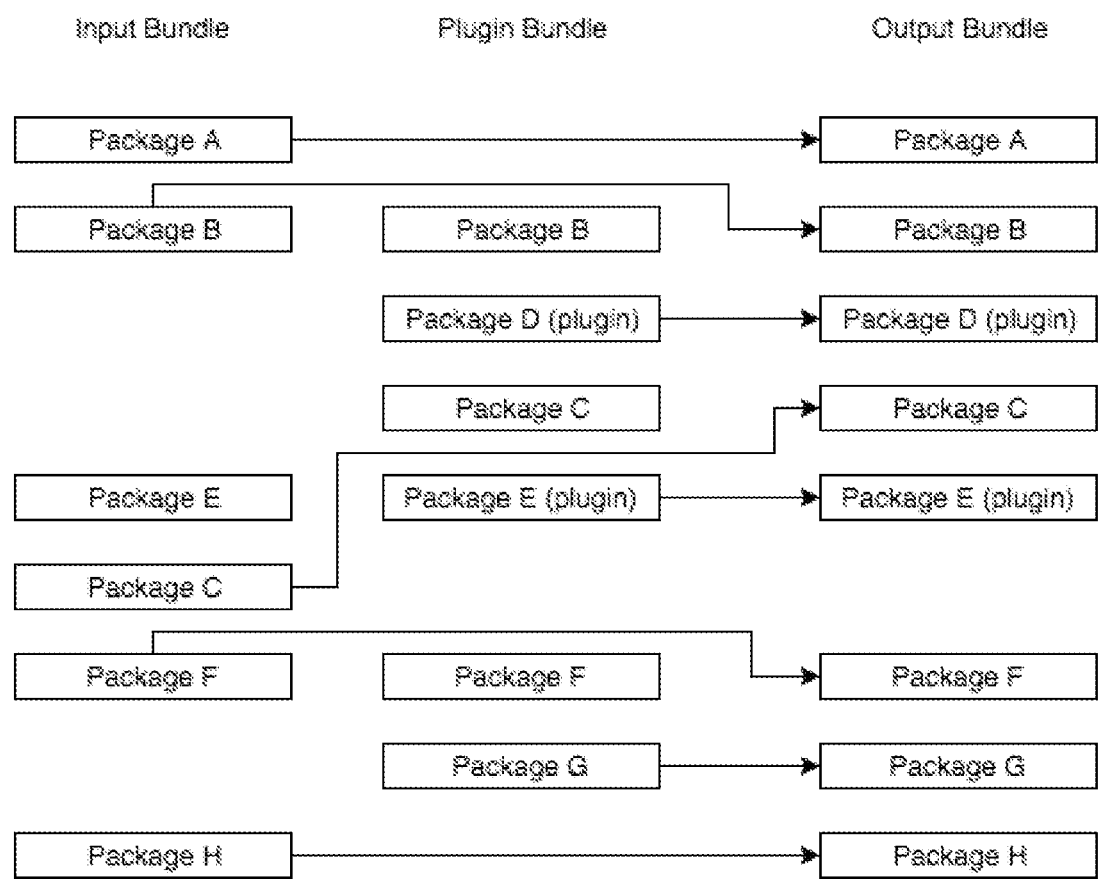
FIG. 2 is a schematic to illustrate rules for ordering of packages during assembly of an output program.

Application of the above example ordering rules can be understood particularly with reference to FIG. 2.

As can be seen, use of the selection and/or ordering rules effectively allows for identifying at least one newly added second package in a second bundle for merging with a first bundle. Upon determining that the newly added package is appropriate for inclusion into the desired output program, there can be a step of re-concatenating the original minified bundle and the new minified bundle into a final minified bundle in which each of the packages of the first bundle and the second bundle coexist in a proper operational order.

Following the merging, bundled code may be re-assembled. For performance reasons, such as in the case when employing a Meteor build platform, it is possible that a "Program" file may contain only one entry for each file type (js, css). This may have been split during an earlier step. Thus, at this time such files (e.g., js and/or css files) may be re-assembled into single tiles. Further, hashes of output files that may have been employed in the pre-existing computer program may be re-computed. Upon conclusion of merging operations (e.g., after taking appropriate steps to terminate merging operations) the output bundle may be run as a program.

The teachings may also employ a step, of creating a bundle of modifications (e.g., one or more plug-ins, extensions, files, dependencies, combination thereof of the like) to add and/or modify one or more functionalities of the pre-existing computer program. The bundle of modifications may include one or a plurality of individual packages. Each individual package may include one or more plug-ins, and/or a component of a plug-in. Thus, a bundle of modifications may include one of at plurality of plug-ins, with each in the form of a discrete package.

Each individual package including a plug-in (or a component thereof), may be named or otherwise identified. The name may be selected in accordance with conventions for the language of the plug-in (or component thereof), such as a convention for a name or other identifier for the scripting language employed. Accordingly, there may be a list of package names (see FIG. 1) that is or may be generated when the packages are named. For example, implicit in the above teachings as a whole, in the course of developing the software the developer may assign names or other identifiers to the packages and record them as part of documentation (e.g., developer notes). Such documentation may be visible to other persons. In this manner, an author of subsequent modifications (e.g., plug-ins) can identify target locations by reference to the names.

In a conventional programming process, an author seeking to incorporate a plug-in into a pre-existing computer program typically would have access to the source code, and could precisely identify a location at which to insert the plug-in (e.g., by a manual insertion), and which code the plug-in would overwrite. The present teachings differ from stitch conventional scenario in that the underlying source code is not visible to an author of a modification (e.g., plug-in). The present teachings also differ because insertion of a modification can be performed automatically, by a computer, according to pre-defined rules (e.g., the selection rules and/or the ordering rules described herein). By use of an automated package identifier comparison and rules for ordering of collections of code when merging a plug-in bundle, a surprisingly reliable approach to software development is possible.

The present teachings make use of a surprising discovery that reliable merging of a modification (e.g., plug-in) with a pre-existing computer program (and any attendant overwriting of an obsolete portion), can be achieved with reliability without access to the underlying code of the pre-existing computer program. This is believed possible, at least in part, due to the employment of a unique approach of merging one or more modifications (e.g., one or more plug-ins) with the pre-existing computer program using the rules set forth in the present teaching. That is, a merging operation (e.g., one performed automatically by a computer) can be employed in order to create, a computer program that is modified relative to the pre-existing program and incorporates the modifications.

As indicated, for performing the build of an input/plugin bundle, the Meteor build platform (which includes building software based upon the Meteor JS platform) may be employed.

Collections of code may be identified using names or other identifiers. Such identifiers may be assigned using file naming conventions, such as those using alphanumeric indicators. However, this is not necessarily the only approach to identify collections of code, and other naming conventions or techniques may be employed or created.

An output bundle may result from the merging step. From the output bundle an output program may result. The output program thus may include the pre-existing computer program and any modifications. Advantageously, one, two or more, or all of such steps of the method of the teachings may be employed without the need to access underlying source code for the pre-existing computer program.

In general, the teachings herein able to achieve the intended objectives (e.g., avoiding revelation of proprietary source code to persons other than the author of the source code) by the unconventional introducing and/or merging steps by which certain rules are employed for incorporating modifications into the pre-existing computer program. That is, steps may be performed by employing one or more algorithms that operate as to successive packages in a modification or plug-in bundle to compare the names or identifiers of each package in a modification or plug-in bundle with names or identifiers of each package in an input bundle that includes the packages of the pre-existing computer program.

It will be appreciated from the above that the methodology of the present teachings may be embodied in one or more algorithms. The one or more algorithms may be part of a computer program for executing the methodology of the present teachings; with such computer program (with its one or more algorithms) being fixed in a non-transitory computer readable storage medium. Likewise, the pre-existing computer program to be modified, any modification to the pre-existing computer program, and a resulting modified computer program each may be fixed in a non-transitory computer readable storage medium.

III. System

As will be appreciated, the teachings herein may be employed as part of a network, a website, or some other computing system accessible by multiple persons. For example, a system in accordance with the present teachings may include one or more computer servers, which may include and or have access to one or more memory units for storing a pre-existing computer program and/or to which a pre-existing computer program and any proposed modification can be uploaded. The one or more computer servers may include one or more computer processors capable of executing the operations of the present teachings. The one or more computer processors may be in signaling communication (e.g., via a network) with the one or more memory units and/or one or more other computer processors. In this manner the one or more computer processors is able to retrieve the pre-existing computer program, the proposed modification and execute the steps of the methodology of the teachings herein to incorporate the modification into the pre-existing computer program without accessing the underlying code of either or both of the pre-existing computer program or the proposed modification.

Any of a variety of computers may be employed for a server in the present teachings. The computer may be a mainframe, a workstation, a personal computer, a tablet, a smartphone or some other type of computer processing device. Any memory or other storage medium may be a volatile type or a non-volatile type of non-transitory computer-readable media. It may be random-access memory (RAM), read-only memory (ROM), or any other suitable memory component. Preferably, a method of the present teachings may be performed by software, which is fixed in a non-transitory computer readable storage medium and contains instructions for performing the steps of such method. Any of a pre-existing computer program to be modified, any modification to the pre-existing computer program, and a resulting modified computer program (upon which the method of the teachings has been performed (e.g., using software of the teachings) each may be fixed in non-transitory computer readable storage medium.

The overall flow of the methodology employed in accordance with the present teachings is illustrated in the flow diagram of FIG. 1 where it is seen generally how a pre-existing computer program is merged with a plug-in bundle. As the merging operation is occurring an indexing step may also be occurring so that a location in the resulting ordering of packages can be established for a package. It will be seen from the illustration that follows, that the rules for ordering of packages in a resulting output program may follow general ordering rules as previously described.

FIG. 1 illustrates operation of the various rules herein for determining which packages are included in an output program. For this methodology, an initial value of −1 is used for the last insertion index. It also illustrates indexing for insertions, by which the resulting order of packages may be achieved. In step 1, inputs may be entered or retrieved, the inputs being names of packages from a proposed plug-in bundle and names of packages in an output program. The output program may dynamically change throughout performance of the methodology. Initially it may include the packages from the pre-existing computer program. As the output program changes, it may be kept in an "output bundle". Insertion index values are employed, for defining the proper order of packages in the output program. Insertion index values may be assigned based upon application of the ordering rules of the present teachings.

In step 2, a package name comparison may be made to ascertain if a commonly named package exists in the output program with a package from the plug-in bundle. If no, then the last insertion index may be incremented, and the package inserted at the old value for the last insertion index, and then step 1 may be repeated for a next package. If yes, then the method may proceed to step 3.

In step 3, a comparison may be made as between names of plug-in packages and other packages (e.g., dependency packages) of the plug-in bundle. If the package name is in the list of plug-in package names, the method may proceed to step 4*a*. If the package name is not a plug-in package name, then the method may proceed to step 4*b*, to ascertain the index order in which the package should be inserted.

Per step 4*a* if the index of the package in the output program is greater than or equal to the last insertion index, the method proceeds to step 5*b*, and the package in the output program may be replaced with the plug-in package from the plug-in bundle. Then, per step 6*a*, the last insertion index may be set to the index of the package for its location in the final resulting output program, and incremented.

Per step 4a, if the index of the package in the output program is not greater than or equal to the last insertion index, the method may proceed to step 5a, where the pre-existing package of same name can be removed from the output program, and then (per step 6c) the last insertion index incremented. Then (per step 7) the package may be inserted at the old value of the last insertion index.

Per step 4b, if the index of the package in the output program is greater than or equal to the last insertion index, then the method may proceed to step 6a. If not, then the last insertion index can be incremented according to step 6b.

FIG. 2 illustrates, without limitation, an example of the application of rules for governing what packages are included in an output program, and an order in which the packages appear in the resulting output program. In the left-side column, packages from the pre-existing program are shown. That program includes Packages A, B, C, E, F and H. They are provided as an input bundle. To the input bundle it is desired to introduce a plug-in bundle, which will be subjected to a merging operation to result in an output bundle. The plug-in bundle is to include Packages B, D (plug-in), C, E (plug-in), F and G.

Rule 1: a plug-in package may be included in the output program if a package by the same identifier was in the pre-existing computer program; in such instance then the package from the pre-existing computer program is omitted from the output program. In other words, a package from the pre-existing computer program may be omitted from the output bundle if the package was in the pre-existing computer program and the package is the object of a plug-in package. A package from the above Rule 1 replaces the entry in the output program file at the location of the package from the pre-existing computer program (e.g., Package E (plug-in) replaces Package E).

Rule 2: a plug-in package may be included in the output bundle if a package with the same identifier was not in the pre-existing computer program. Such plug-in package is located in the output bundle in its corresponding sequence as in the plug-in bundle (e.g., Package D (plug-in)).

Rule 3: a package from a plug-in bundle that is not a plug-in package may be included in the output program if a package having the same identifier was in both the pre-existing computer program and in the plug-in bundle. In such instance, the location of the package will be in the corresponding position it holds in the plug-in bundle (e.g., Packages C, B, and F).

Rule 4: a package from a plug-in bundle that is not a plug-in package may be included in the output program if a package having the same identifier was not in the pre-existing computer program and is in the plug-in bundle. In such instance, the location of the package will be the corresponding position it holds in the plug-in bundle (e.g., Package G).

Rule 5: a package may be included in the output program if no package having the same identifier as a package in the pre-existing computer program is found in the plug-in bundle. In such instance, the location of the package will correspond with its position in the input bundle (e.g., Packages A and H).

A further illustration of the present teachings is provided in FIGS. 3a-3g. With reference to FIGS. 3a-3c, the following Example illustrates how the present teachings might be carried out in practice. FIG. 3a depicts a pre-existing computer program (e.g., a program that has source code in a scripting language) that has three packages (denoted A, B, and C) with their respective functionalities and dependencies identified. The functionality of package C depends upon package B.

With reference to FIG. 3b, the respective packages are minified and are diagrammed with the respective minification. A resulting minified bundle is provided in FIG. 3c.

According to FIG. 3d, a third-party developer, who will have no access to the underlying source code of the pre-existing computer program, may still receive the overall minified bundle (e.g., without boundaries between packages specified). A list of packages is also provided (e.g., provided as empty packages) and their respective dependencies upon each other. Additionally, documentation of available features and functions about the minified bundle (which would also be recognized as including package identifiers) may be provided also.

As seen in FIG. 3e, the third-patty developer creates additional source code. For this example, the additional source code is identified as package D, and its dependencies are also identified. From FIG. 3f, it is seen that package D is minified to form a bundle also. The minified bundle from the source code of package D is thereafter merged with the bundle of packages A-C, as depicted in FIG. 3g.

FIGS. 4a-4d illustrate an example of how packages may be inserted into an output program in accordance with the present teachings. In this illustration, multiple packages of a plug-in bundle are inserted into an output program. At the outset, as seen in FIG. 4a, the output program has four packages indexed in the following order, of Table 1.

TABLE 1

| Initial Output Package-Names | Index Order |
|---|---|
| dependency0 | index 0 |
| dependency1 | index 1 |
| addon1 | index 2 |
| app | index 3 |

In the plug-in bundle, there are contained two plug-in packages, named addon1 and addon 2, along with a package named dependency1.

Package identifier comparison takes place, in this instance, if a plug-in package identifier among the packages sought to be introduced is found in the output program, (in FIG. 4a: dependency1), it is not inserted into the output program. Accordingly, the last insertion index is at 0.

With reference to FIG. 4b, plug-in package addon1 is compared with the output, program. In this instance, the plug-in package will overwrite original addon1 and will be added to the output program (shown in FIG. 4c). The inserting index will be incremented by 1.

With reference to FIG. 4c, the next package identifier comparison will be with plug-in package addon2. Because there is no pre-existing addon2, the addon2 plug-in package will be inserted following inserted plug-in package addon1. The insertion index will be incremented by 1. The resulting output program, as seen in FIG. 4d thus includes the two plug-in packages in their respective indexed order. It is seen that original package named app is pushed back in the order to the index 4 location.

General Discussion

The pre-existing computer program of the present teachings and any resulting output program that arises by use of the teachings herein may have any of a variety of different applications, all of which are part of the present teachings.

By way of example, without limitation, the teachings envision use of computer programs resulting (e.g., modified) from the present teachings. The teachings envision use of computer programs resulting from the present teachings as part of a machine control system (e.g., for controlling operation of a vehicle, transformation of an article from a first physical state to a second physical state, an appliance, a personal electronic device, a biomedical monitoring device, a manufacturing apparatus, a sensing device, a navigational instrument, or otherwise), a time management system, a project management system, a budget management system, a billing system, or a combination thereof. For example, it is possible that the teachings may include a manufacturing system that includes a machine that includes a computer program modified as taught herein for controlling a transformation of an article from a first physical state to a second physical state. The teachings envision use of computer programs resulting from the present teachings as part of an artificial intelligence system. Other applications in which software created by the present teachings include but are not limited to a computer-controlled system for one or any combination of material handling, inventory management, operation of a motor vehicle, operation of some other transportation vehicle, road traffic management, a medical device, a medical testing device, or otherwise.

As can be appreciated with respect to the teachings herein, it is often desired that when rights to a software system are purchased from a vendor, the buyer wants to modify the software to fit their own purposes but the vendor does not want to reveal the source code. The present disclosure overcomes this problem. To illustrate, project management software may include functional components that may address one or more of the following: copying tasks for multiple iterations, applying certain font formats to tasks in a list, categorizing workload by sorting deadline terms (e.g., long-term, short-term, or medium-term), creating and updating tasks by email, planning and managing meetings, real-time updates on member activity, resource management, or a combination thereof. It can be appreciated by the present disclosure that the functional components are associated with a plug-in and by the method of the present disclosure, the plug-ins may be added to the pre-existing program without the need to access the source code of the pre-existing program, thereby allowing a developer to customize the overall functionality of the software.

The teachings also contemplate a machine control system that includes computer program modified in accordance with the teachings. The machine control system may include a microcontroller (e.g., a microcontroller of a type such as the Espruino Pico or the Raspberry Pi controller), which may optionally have wireless connectivity for remote signaling communication and may be configured with a computer program adapted for controlling: power for building lighting, computer hardware operation, appliance operation, entertainment hardware operation, and/or heating/ventilation/air conditioning control.

The teachings also contemplate a building automation system that includes a microcontroller (e.g., a microcontroller of a type such as the Espruino Pico or the Raspberry Pi controller), which may optionally have wireless connectivity for remote signaling communication, and is configured with a computer program modified according to the teachings and being adapted for controlling: power for building lighting, computer hardware operation, appliance operation, entertainment hardware operation; and/or heating/ventilation/air conditioning control.

The teachings also envision a system that includes at least one programmable computer having a non-transitory computer readable storage medium associated with it, and at least one machine that operates to transform an article from a first physical state to a second physical state. The at least one computer and the at least one machine may be located proximate each other (e.g., within about one kilometer), or remotely from each other (e.g., greater than about one kilometer) method of repairing an automated system at or near the site of the machine or other physical equipment associated with the system. The teachings thus contemplate a method by which software is created as a repair to pre-existing software, in response to a malfunction of the system. The repair may take place proximate or remotely from the site of the computer, the computer or both.

The teachings also envision a non-transitory storage medium comprising a hardware device configured for storing a computer program (e.g., a pre-existing computer program and/or a minified version thereof) in electronic format and a merging program having instructions for carrying out the methods described in the present teachings for merging. The merging program may be configured with instructions for accessing a pre-existing computer program that is written in a scripting language and includes at least one pre-existing first package of source code written in a scripting language and having a first package name, and for merging with the pre-existing computer program at least one second package of source code, also written in the scripting language and having a second package name, without revealing any underlying source code of the first package, and without revealing to any subsequent author any underlying source code of the second package.

By way of a general summary, as seen from the discussion throughout, in general, the present teachings envision technology including a computer-implemented method (and software and systems) for modifying a pre-existing computer program, to create an output program that differs from the pre-existing computer program. An advantage of the method, software and systems (and use thereof), and one of its core operations includes modifying a pre-existing computer program (including at least one package of source code) without the need to access source code for the pre-existing computer program.

In a general sense, the method, software and systems contemplate the employment of a step of accessing a pre-existing computer program having at least one pre-existing first package of source code and having a first package identifier. A further step is employed that includes merging with the pre-existing computer program at least one second package of source code (which second package may embody a modification) having a second package identifier. Desirably, the steps of accessing and merging are performed without revealing to an author (e.g., an author of a modification) any source code of the at least one first package, and without revealing to any subsequent author any source code of the at least one second package (e.g., the source code for the modification).

In general, for all embodiments, it is possible that computer program modifying may take place as between a pre-existing computer program and a resulting modified program without the revelation of source code as between different authors. It is possible that computer program modifying may take place as between a pre-existing computer program and a resulting modified program with a step of revealing package identifiers (or other developer documentation) as between different authors absent revealing underlying source code.

Though the teachings herein apply to avoid revealing to a subsequent author of the entire underlying source code, it is still within the scope of the teachings to use the teachings with affording access to a finite proportion of the entire source code. For example, it may be possible that the teachings involve revealing a portion of source code from a pre-existing computer program (e.g., less than about 70%, 50% or 30% of the total lines of source code of the pre-existing computer program). The teachings may be performed while accessing substantially no (i.e., less than about 10% of the total lines of source code) from the pre-existing computer program.

The present teachings, in general, could involve methods, software adapted for (and stored on a non-transitory computer readable storage medium) or systems by which one or more steps of minifying source code of a pre-existing computer program are performed. The minifying may employ an operation that obfuscates the source code. As explained, the minifying may also include identifying at least one pre-existing first package of the source code that has been minified; providing a location indicator as to a start and an end of each minified version of the source code; retaining a correct order of dependencies in resulting minified packages; describing a functionality of each minified package without reference to the source code; or any combination thereof. It is thus apparent that upon receipt of a minified collection of code from a preexisting computer program, a subsequent author desiring to modify the program can be deprived of access to the source code (or portions thereof). However, the subsequent author has information by which the modification can be generated and then merged with the preexisting program.

One technique that contributes to the performance of the teachings involves applying as part of use of the method, software and system at least one set of rules. Of course, when applying the rules, there may be a step (whether in the method, system or instruction embodied in any software stored on a non-transitory computer readable storage medium) by which there is a comparing of at least one package of a modification with at least one package of a pre-existing program. The comparing may be based upon an identifier associated with each package. The identifier can be a characteristic of a minified package.

Based upon the comparing, one set of rules (e.g., selection rules) may determine if any such package of the modification replaces any such package of the pre-existing program. Based upon the comparing, another set of rules may determine the order in which any such package of the modification should be located relative to other packages. The latter rules may selected in a manner to assure proper dependencies of packages in the resulting modified computer program. The sets of rules need not be applied separately. They can be each combined together as a single set of rules. It is also possible that some of the rules can be broken into sub-sets of rules and applied as respective subsets. They also need not necessarily be applied in the order recited herein.

The following are examples of selection rules that may be employed in the present teachings to create an output program from a modification to a pre-existing computer program. Selection rule 1 may involve including a plug-in package from a plug-in bundle in the output program if a package by the same identifier was in the pre-existing computer program. Selection rule 2 may involve including a plug-in package from a plug-in bundle in the output program if a package with the same identifier was not in the pre-existing computer program. Selection rule 3 may involve including a package from a plug-in bundle that is not a plug-in package (whether from the plug-in bundle or the pre-existing computer program) in the output program if a package having the same identifier was in both the pre-existing computer program and in the plug-in bundle. Selection rule 4 may involve including a package from a plug-in bundle that is not a plug-in package is included in the output program if a package having the same identifier was not in the pre-existing computer program and is in the plug-in bundle. Selection rule 5 may involve including a package from a pre-existing computer program in the output program if no package having the same identifier as a package in the pre-existing computer program is found in the plug-in bundle.

The following are examples of ordering rules that may be employed in the present teachings to create an output program from a modification to a pre-existing computer program. Ordering rule 1 may involve locating a plug-in package having the same identifier as a package from the pre-existing computer program at the location of the package with the similar name. Ordering rule 2 may involve locating a plug-in package not having the same identifier as a package from the pre-existing computer program at the location as arranged in the plug-in bundle, especially relative to any other plug-in packages in the plug-in bundle. Ordering rule 3 may involve locating a package from a plug-in bundle not having the same identifier as a package from the pre-existing program will take the location as arranged in the plug-in bundle, especially relative to any other plug-in packages in the plug-in bundle.

As would be appreciated, application of the selection and ordering steps are repeated for all packages of a proposed medication, until completion.

As can be appreciated the merging operation, including any selecting and ordering steps may be performed by a computer according to software having instructions for carrying out such step and being contained on a nontransitory computer readable storage medium in accordance with the present teachings. In addition, a system, including hardware and such software may be part of the present teachings.

The teachings illustrate a discrete, unique and unconventional approach to scripted language computer programming by way of a collaboration, in which collaborators may be anonymous to each other and/or lack contractual privity with each other, and which can occur without the conventional exchange of underlying source code. The teachings are able to harness one or more technical features unique to scripting language and use it in an unconventional manner to afford software modification in a manner that preserves confidentiality in underlying source code.

The present teachings may be applicable to one of more systems that afford the ability of multiple parties to modify a pre-existing computer program by way of a network. By way of general illustration of a system for development of a software program authored in a scripted language on a computer network (e.g., the Internet) by individually controlled network accounts, it is contemplated that the system may include a local client computer including a first processor configured for accessing and/or reading a minified pre-existing computer program authored in a scripted language from the computer network, and a first non-transitory computer readable storage medium. The system may also include a remote server in signaling communication with the client computer and the computer network, the remote server including a second processor configured for accessing and/ or reading the minified pre-existing computer program from the computer network, and a second non-transitory computer readable storage medium. One or more networks may include one or more local area networks (LAN), wide area networks (WAN), Internet, the like, or any combination thereof. The system may include a merging program (as taught herein) executable by the first processor, the second processor, or both, and being stored on either or both of the first or second computer readable non-transitory computer readable storage medium, the merging program including a plurality of selection rules (as taught herein) and/or ordering rules (as taught herein) that causes the first processor, the second processor or both to receive a modification to the pre-existing computer program written in the scripted language and merge it with the pre-existing computer program according to the plurality of selection rules and/or ordering rules.

The use of "about" or "approximately" in connection with an amount or range applies to both ends of the range. If an element, component or step is included among a listing of other elements, components or steps, the teachings envision that one or more elements, components or steps may be omitted from such listing without departing from the present teachings. The term "consisting essentially of" to describe a combination shall include the elements, components or steps identified, and such other elements, components or steps that do not materially affect the basic and novel characteristics of the combination. The use of the terms "comprising" or "including" to describe combinations of elements, components or steps herein also contemplates embodiments that consist essentially of (namely, the presence of any additional elements, components or steps, does not materially affect the properties and/or benefits derived from the teachings), as well as embodiments that consist of such elements, components or steps.

It is understood that the above description is intended to be illustrative and not restrictive. Plural elements, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, components or steps. "Author" refers to a software developer, or other user who creates code for a computer program.

Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of any articles and references, including patent applications and publications, are incorporated by reference for all purposes. Moreover, the entire contents of the priority application, U.S. Application Ser. No. 62/615,215, are expressly incorporated by reference herein, for all purposes. Further, the omission in the above description and in following claims of any aspect of subject matter that is disclosed herein, or in the priority application, is not a disclaimer of such subject matter, nor should it be regarded that the inventors did not consider such subject matter to be part of the disclosed inventive subject matter.

What is claimed is:

1. A computer-implemented method for modifying a pre-existing computer program, to create an output program with another package of code that differs from the pre-existing computer program, without the need to reveal a source code of the pre-existing computer program, comprising the steps of:
    a) a minifying so the source code of the pre-existing computer program is processed in a manner that obfuscates the source code of the pre-existing computer program;
    b) an accessing of the pre-existing computer program having at least one pre-existing first package of code; and
    c) a merging with the pre-existing computer program at least one second package of code, wherein the accessing and the merging are performed without revealing to an author of the at least one second package of code a source code of the at least one pre-existing first package of code;
    wherein the at least one second package of code modifies and/or adds to a functionality of the at least one pre-existing first package of code; and
    wherein the pre-existing computer program includes a plurality of packages in a first bundle; wherein at least one of the plurality of packages is a dependent package, a functionality of the dependent package being reliant upon a predetermined function performed by another of the plurality of packages; and
    wherein the dependent package is identified as well as relationships between or among the plurality of packages.

2. The method of claim 1, wherein the minifying is prior to or part of the accessing, and the minifying still:
    a) identifies the at least one pre-existing first package of code that has been minified into at least one minified package;
    b) provides a location indicator as to a start and an end of each of the at least one minified package;
    c) the at least one minified package resulting from the minifying retains a correct order of dependencies;
    d) describes a functionality of each of the at least one minified package without reference to the source code of the at least one pre-existing first package of code; or
    e) any combination thereof.

3. The method of claim 2, wherein the accessing, the merging, or both includes a generating of a plurality of empty packages to correlate with the at least one pre-existing first package of code as to their respective dependencies.

4. The method of claim 2, wherein the merging includes:
    a) minifying the at least one second package of code to form a second minified bundle of code; and
    b) combining the second minified bundle of code with a first minified bundle of code.

5. The method of claim 4, wherein the merging includes:
    a) identifying the at least one second package code in the second minified bundle of code;
    b) slicing the first minified bundle of code and the second minified bundle of code; and
    c) re-concatenating the first minified bundle of code and the second minified bundle of code into a final minified bundle of code in which each of the packages of the first minified bundle of code and the second minified bundle of code coexist in a proper operational order.

6. The method of claim 4, wherein the method is performed generally in parallel by a plurality of authors, each preparing source code for use with an underlying software program, and the method includes no disclosure of the source code of the at least one pre-existing first package of code or any bundle including the at least one pre-existing first package of code.

7. The method of claim 4, wherein the at least one pre-existing first package of code is one of a plurality of packages of code that are part of an input bundle from the pre-existing computer program; and wherein the at least one second package of code is one of a plurality of packages of code that are part of a plug-in bundle.

8. The method of claim 7, wherein the merging includes employing one or any combination of the following selection rules:

a) selection rule 1, wherein a plug-in package from the plug-in bundle is included in the output program if the pre-existing computer program includes a package with an identifier the same as an identifier of the plug-in package;

b) selection rule 2, wherein a plug-in package from the plug-in bundle is included in the output program if the pre-existing computer program does not include a package with an identifier which is the same as an identifier of the plug-in package;

c) selection rule 3, wherein a package from the plug-in bundle that is not a plug-in package is included in the output program if a package having a same identifier was in both the pre-existing computer program and in the plug-in bundle include a package with an identifier which is the same as an identifier of the package from the plug-in bundle;

d) selection rule 4, wherein a package from the plug-in bundle that is not a plug-in package is included in the output program if the pre-existing computer program does not include a package with an identifier which is the same as an identifier of the plug-in package and the plug-in bundle does include a package with an identifier which is the same as an identifier of the plug-in package; and e) selection rule 5, wherein a package from the pre-existing computer program is included in the output program if no package having a same identifier as the package in the pre-existing computer program is found in the plug-in bundle.

9. The method of claim 1, wherein the merging includes applying a set of ordering rules to assure proper dependency among packages in the output program.

10. The method of claim 9, wherein the merging includes applying one or any combination of the following ordering rules:

a) ordering rule 1, wherein a plug-in package having a same identifier as a package from the pre-existing computer program will take a location of the package with the same identifier;

b) ordering rule 2, wherein a plug-in package not having a same identifier as a package from the pre-existing computer program will take a location as arranged in a plug-in bundle relative to any other plug-in packages in the plug-in bundle; and c) ordering rule 3, wherein a package from a plug-in bundle not having a same identifier as a package from the pre-existing computer program will take a location as arranged in the plug-in bundle relative to any other plug-in packages in the plug-in bundle.

11. The method of claim 1, wherein the at least one second package of code is a package of source code.

12. The method of claim 1, wherein the pre-existing computer program has a first package identifier and the at least one second package of code has a second package identifier.

13. The method of claim 1, wherein the accessing and the merging are performed without revealing to any subsequent author any source code of the at least one second package.

14. A system for modifying a pre-existing computer program using the method of claim 1, comprising:

a) a local client computer including a first processor configured for accessing, reading, or both, a minified version of the pre-existing computer program from a computer network, and a first non-transitory computer readable storage medium;

b) a remote server in signaling communication with the local client computer and the computer network, the remote server including a second processor configured for accessing, reading, or both, the minified version of the pre-existing computer program from the computer network, and a second non-transitory computer readable storage medium; and c) a merging program executable by the first processor, the second processor, or both, and being stored on the first non-transitory computer readable storage medium, the second non-transitory computer readable storage medium, or both, the merging program including a plurality of selection and ordering rules that cause the first processor, the second processor, or both to receive a modification to and merge with the minified version of the pre-existing computer program.

15. The system of claim 14, wherein the merging program is configured to modify the pre-existing computer program with no disclosure of an underlying source code for the at least one pre-existing first package of code of the pre-existing computer program, an entirety of the pre-existing computer program, any bundle including either, or a combination thereof.

16. A computer-implemented method for modifying a pre-existing computer program with another package of code, to create an output program that differs from the pre-existing computer program, without a need to reveal a source code of the pre-existing computer program, comprising:

a) an obfuscating of the source code of the pre-existing computer program in a manner which obfuscates the source code of the pre-existing computer program and creates a first bundle of code;

b) an accessing of the pre-existing computer program having at least one pre-existing first package of code;

c) a merging with the first bundle of code at least one second package of code, wherein the accessing and the merging are performed without revealing to an author of the at least one second package of code a source code of the at least one pre-existing first package of code;

wherein the at least one second package of code modifies and/or adds a functionality of the at least one pre-existing first package of code; and wherein the pre-existing computer program includes a plurality of packages in a first bundle;

wherein at least one of the plurality of packages is a dependent package, a functionality of the dependent package being reliant upon a predetermined function performed by another one of the plurality of packages; and wherein the dependent package is identified as well as relationships between or among the plurality of packages.

17. The method of claim 16, wherein the obfuscating is a minifying of the source code of the pre-existing computer program and the first bundle of code is a first minified bundle of code.

18. The method of claim 17, wherein the merging includes:
   a) minifying the at least one second package of code to form a second minified bundle of code; and
   b) combining the second minified bundle of code with the first minified bundle of code.

* * * * *